Jan. 20, 1925.
R. RÜDENBERG
1,523,839
METHOD OF REVERSING ELECTROMOTORS
Filed Aug. 9, 1921
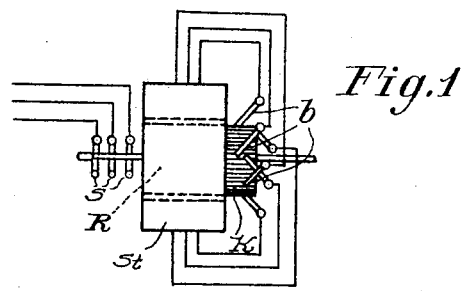
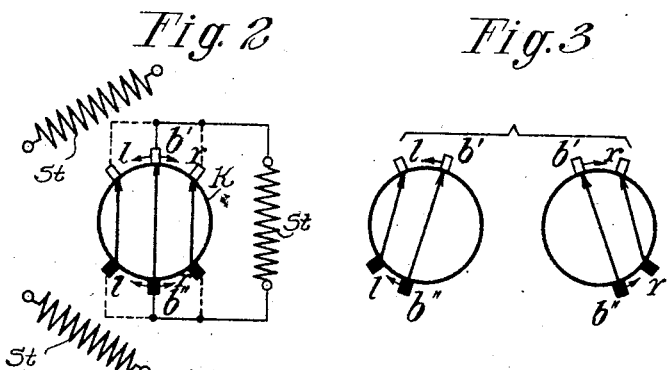
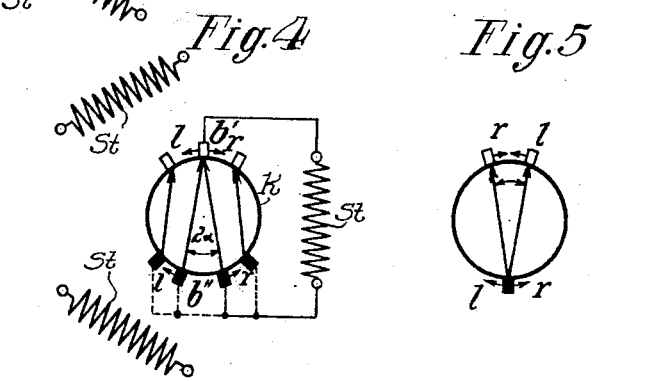
Inventor
Reinhold Rüdenberg
by Knight Bry
Attorneys Patented Jan. 20, 1925.

1,523,839

UNITED STATES PATENT OFFICE.

REINHOLD RÜDENBERG, OF BERLIN-GRUNEWALD, GERMANY, ASSIGNOR TO SIEMENS-SCHUCKERTWERKE GESELLSCHAFT MIT BESCHRANKTER HAFTUNG, SIEMENS-STADT, NEAR BERLIN, GERMANY, A GERMAN CORPORATION.

METHOD OF REVERSING ELECTROMOTORS.

Application filed August 9, 1921. Serial No. 490,944.

*To all whom it may concern:*

Be it known that I, REINHOLD RÜDENBERG, a citizen of the German Empire, residing at Berlin-Grunewald, Germany, have invented certain new and useful Improvements in Method of Reversing Electromotors (for which I have filed applications in Germany, April 8, 1914, Patent No. 311,940; Sweden, March 29, 1915, Ser. No. 637,115; Austria, April 1, 1915, Patent No. 74,888; Hungary, April 6, 1915, Patent No. 71,577; England, February 5, 1920, Ser. No. 12,475; France, April 26, 1920, Patent No. 514,497), of which the following is a specification.

My invention relates to a method of reversing alternating current shunt motors in which the energy is supplied to the stator through the rotor and which are provided with means for shifting the several brushes with different angular speed relatively to each other.

The purpose of my invention is to obtain an extremely simple method by which I am enabled, during the reversing of the motor to shift the brushes—which in these motors are shifted at different speed—into a position from which they can be shifted for the reversing of the motors without impairing the phase compensation. In accordance with my invention during the reversing, one set of brushes is held stationary, and only the other set is shifted.

My invention will be better understood by referring to the accompanying drawings in which:

Figure 1 shows a diagrammatic view of the general arrangement of an alternating current shunt motor embodying my invention;

Figure 2 shows a diagram indicating the connections between the commutator brushes and the stator circuits and indicating the shifting of the brushes for the two directions of revolution if the brushes are shifted relatively to each other at the same angular speed;

Figure 3 shows a double diagram showing the brush positions for the two directions of revolution in case the brushes are shifted relatively to each other at unequal angular speed; and Figures 4 and 5 show the brush positions into which the brushes are shifted when the revolution direction is reversed.

In accordance with the general construction of the motor which is shown in Figure 1, the rotor winding R is supplied with current from the mains through slip rings $s$ as shown. For each phase of the stator winding $st$ a pair of brushes $b$ is provided which slides on the commutator $k$, so that the current is supplied from the rotor to the stator in this manner. In such motors the speed varies if the brushes of each pair are shifted relatively to each other. As is well known the brushes of each pair are shifted relatively to each other at different speeds in order to obtain a good phase compensation within the range of control. However, with such an arrangement it becomes very difficult to reverse the motor.

If the brushes are shifted at uniform speed relatively to each other it becomes possible to shift the brushes to one side of their natural position for one direction of revolution and to the other side for the other direction of revolution, so that for each direction one definite direction of brush shifting is given. For the reversal of the direction of revolution, of course, two of the slip ring conductors must be exchanged.

As may be seen from Figure 2 the stator winding is designated by $st$, the commutator by $k$ and one pair of brushes by $b'$ and $b''$. The other two stator windings are only diagrammatically indicated without connection with their brushes in order to simplify the diagram. As will also be noted from Figure 2 the direction of the electromotive force supplying the stator winding always remains the same and is given by the chords between the brushes $b'$ and $b''$ irrespective as to whether the brushes are shifted to the left or the right. If the motor is to be reversed the brushes may for instance, for clockwise direction, be shifted in the direction of the arrows $r$, and for the opposite revolution direction in the direction of the arrows $l$, starting in each case from the zero position indicated by the diameter in which the motor has its lowest speed and its greatest stator supply electromotive force.

This expedient, however, cannot be employed any more if the brushes $b'$ and $b''$ of each phase are shifted relatively to the stator at unequal angular velocity, which is desirable in order to obtain a good phase compensation. In this case the zero position of the brushes is different from the zero position which the brushes assume in case they are shifted at the same angular velocity. Besides also the zero positions for the different directions of revolution of the motor are different. For instance, if the brushes for left hand revolution should have a zero position shown by $b'—b''$ in the left hand illustration, Figure 3, they must have a zero position for right hand revolution as shown in the right hand illustration of Figure 3. These particular positions are necessary, because the direction of phase shifting of the stator supply electromotive force is dependent upon the direction of revolution of the motor. Therefore, if the motor is arranged for regulation of its speed by means of shifting the brushes angularly at unequal speeds it becomes necessary, when reversing the motor, to provide an additional shifting of the brush sets on the commutator circumference. This additional shifting may preferably be effected at the same time with the changing over of the slip ring connections which bring about a change in the direction of the rotating field of the motor.

Figure 4 shows the particularly simple method forming the subject matter of my invention and by which this necessary shifting of the brush set from one zero position to the other is accomplished. In accordance with my invention one of the brushes is held stationary and only the other brush is shifted. In this case the brushes $b'$ and $b''$ when in their zero positions for the two directions of revolution are not located as shown in Figure 2, such that the chord coincides with the diameter of the two pole commutator, but the imaginary line connecting the two brushes coincides with a chord which forms in the example illustrated the angle $2\alpha$ with the other chord for the other direction of revolution. Thus if a change is made from one direction of revolution into the other the brush $b'$ is held stationary and brush $b''$ is shifted the angle $2\alpha$. It is assumed in Figure 4 that the slowly moved brush is shifted when the direction of revolution is changed. Fig. 5 shows an alternative arrangement in which the quickly moved brush may be angularly shifted relatively to the stator, and the slower moving brush may be held stationary. In the former case the additional brush shifting must occur in the same direction in which the slower moving brush is shifted for the purpose of changing the speed, whereas in the latter of the two cases (Figure 5) the fast moving brush must always be set back for a certain amount in order to reach the correct position which corresponds with the new direction of revolution.

The manner in which the two brushes of each set may be shifted relatively to each other may be accomplished by any means well known in the art, and I do not wish to limit myself to any particular device of shifting brush holders relatively to each other in order to bring about the desired result described hereinbefore.

I claim:—

The method of reversing alternating current shunt motors, the speed of which is regulated by shifting a plurality of sets of brushes with different speeds, consisting in keeping one set of brushes stationary and in shifting the other set from its normal low speed position for one direction of revolution of the motor to its normal position for its other direction.

In testimony whereof I affix my signature.

REINHOLD RÜDENBERG.